J. L. WEBB.
WINDSHIELD CLEANER.
APPLICATION FILED OCT. 29, 1920.

1,379,232.

Patented May 24, 1921.

Inventor
John L. Webb,
By Clark & Clark,
Attorneys.

UNITED STATES PATENT OFFICE.

JOHN L. WEBB, OF SALT LAKE CITY, UTAH, ASSIGNOR TO MICAJAH M. JOHNSON, OF SALT LAKE CITY, UTAH.

WINDSHIELD-CLEANER.

1,379,232.      Specification of Letters Patent.      Patented May 24, 1921.

Application filed October 29, 1920. Serial No. 420,384.

*To all whom it may concern:*

Be it known that I, JOHN L. WEBB, a citizen of the United States, residing at Salt Lake City, in the county of Salt Lake and State of Utah, have invented new and useful Improvements in Windshield-Cleaners, of which the following is a specification.

This invention relates to automobile windshield cleaners, and pertains particularly to cleaners for removing moisture and rain from the glasses of windshields.

The peculiar construction of the cleaner makes it possible to operate the same on the windshield readily and without the application of much physical force because there is substantially no binding except between the wiping surfaces and the glass.

The device is particularly easily attached and the peculiar manner of mounting of the spring wiper arms provides a quick detachable feature which is highly desirable.

The cleaner may be formed of inexpensive materials and the spring cleaner arms may be made of spring wire and the wiping surface preferably is rubber tubing slipped over the wire.

These and other advantages and details of the wind-shield cleaner will be described and claimed in the following specification and claims and illustrated in the accompanying drawing, in which:

Figure 1:
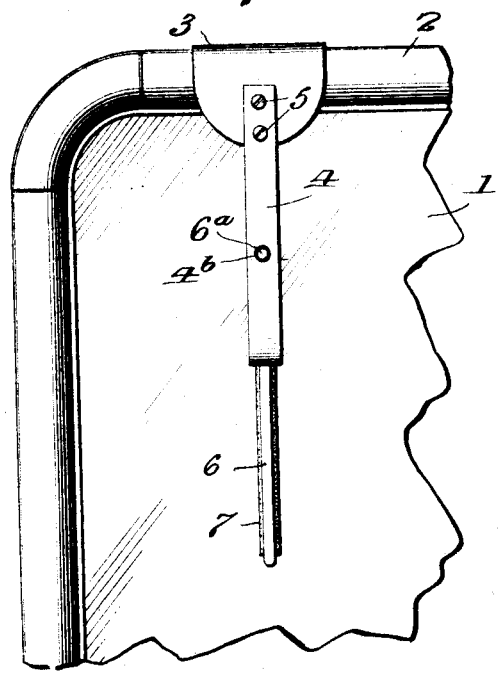
Figure 1 is a front view showing a cleaner mounted on a windshield.
Figure 2:
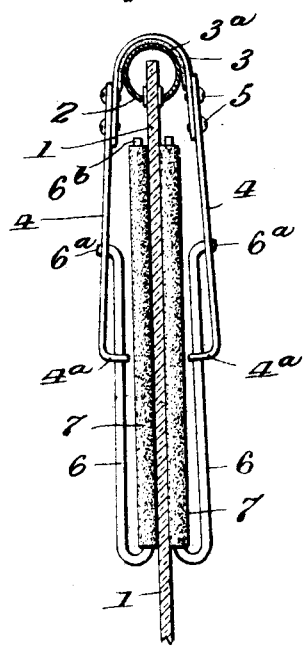
Fig. 2 is a side view showing the windshield in section and illustrating the position of the cleaner when mounted.

Referring in detail to the drawings, Fig. 1 shows a windshield glass 1 having a metal rim 2 of tubular construction, such as is commonly used. In Figs. 1 and 2 the central member or saddle of the cleaner is illustrated as extending across the windshield and resting on the metal rim 2. The saddle is indicated at 3. Extending from opposite sides of the saddle and substantially parallel with the windshield are the primary or outer arms 4, illustrated as formed of flat metal and fixedly secured at one end to the saddle by suitable screws 5. The lower ends of the arms 4 are bent inward, forming the projections 4$^a$. Midway of the primary arms 4 are the primary openings therethrough 4$^b$, and through the projections 4$^a$ are secondary openings 4$^c$. The secondary or wiper arms of the cleaner are formed of spring metal and each is bent back on itself substantially midway of the length thereof and is preferably formed of round spring wire rod 6 having an outer portion which is fitted into engagement with the arms 4 by being thrust upward through the hole 4$^c$ and locked into contact by having the lug 6$^a$ inserted into the opening 4$^b$. The opposite or wiper end 6$^b$ is recurved and extends parallel to the arms 4 and 6 and is adapted to carry the wiping material 7, which is preferably formed of rubber tubing fitted over the round member 6$^b$.

It will be observed that the construction provides thorough resilient yielding, made possible by the double recurved spring arms. The two wiper arms readily adjust themselves to the windshield glass on which they are fitted because there is a spring movement provided by the mounting of the arms 4 at one end on the saddle, a second spring movement due to the length of the rod 6 and its recurved end 6$^b$, and a third compound yieldable movement due to the fact that the arm 6$^b$ is provided with substantially two pivot points, namely, the mounting at the saddle and the lower recurved end of the arm 6.

The wiper arms normally exert a resilient yieldable pressure against each other. When it is desired to dismantle the device, one of the recurved ends 6$^b$ is pushed to one side and the lower end pulled outwardly to disengage the lug 6$^a$ from the opening 4$^b$. The wiper arm 6$^b$ may then be turned sidewise and the pressure on the windshield glass thus relieved, and the wiper arm may be drawn downward and removed from the arm 4 if desired. If difficulty is experienced in springing the device over a windshield rim when both wiper arms are in position, the device may be fitted with a single arm in position and the opposite arm may be sprung into place by reversing the movement just described with regard to detaching the arm 6$^b$.

Figure 3:
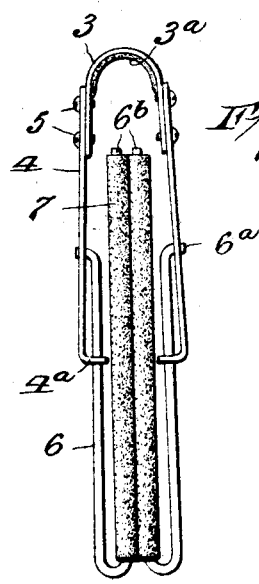
Fig. 3 is a view of the cleaner illustrated in Fig. 2, but with the windshield removed from between the recurved arms carrying the wiper members.
Figure 4:
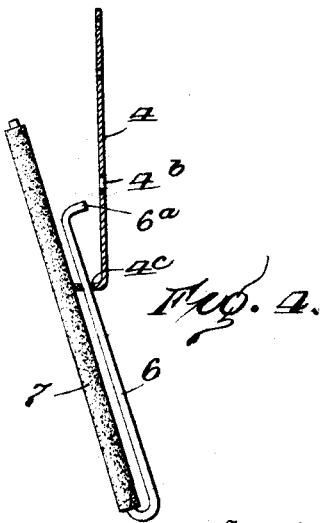
Fig. 4 is a fragmentary view in section illustrating the openings in one of the main arms through which the recurved wiper arm extends and is locked.

In Figs. 2 and 3, a felt lining is illustrated at 3ª as secured to the under side of the saddle to protect the windshield rim from being scratched by the metal of the saddle.

The device has proved readily attachable, the materials obviously may be inexpensive, and the wiper material may be obtained anywhere. Rubber tubing is in common use and is readily slipped on the recurved rods. This feature provides a decided advantage over other forms which require particular types of wiper material where such material wears out or dries and tends to scratch the windshield glass. By using rubber tubing this part of the device may be readily renewed.

What I claim is:

1. A windshield cleaner comprising a saddle member adapted to be supported on a windshield, a yieldable wiper arm having one of its ends secured to the saddle member and extending therefrom for a portion of its length, thence inwardly toward the windshield glass, and thence toward the saddle and substantially parallel with said portion to provide a wiper portion, said wiper portion being provided with a wiping element, and means to press the arm against the glass.

2. A windshield cleaner comprising a saddle member adapted to be supported on a windshield, a resiliently yieldable wiper arm having one of its ends secured to the saddle member and extending therefrom for a portion of its length, thence inwardly toward the windshield glass, and thence toward the saddle and substantially parallel with said portion to provide a wiper portion terminating in a free end, said wiper portion being provided with a wiping element, and means connected to said saddle and adapted to engage the opposite side of a windshield glass to balance the pressure of said resiliently yieldable wiper arm.

3. A windshield cleaner comprising a saddle member adapted to be supported on a windshield, a yieldable multiple part wiper arm including a primary arm having one of its ends secured to said saddle member and adapted to extend therefrom along a windshield glass, a wiper arm detachably mounted on said primary arm extending in a recurved position inwardly and thence substantially parallel alongside of said primary arm to provide a wiper portion terminating with a free end, said wiper portion being provided with a wiper element, and means coacting with said saddle to hold said yieldable multiple part wiper arm in the operative position and permit the yieldable wiper arm to engage the windshield glass resiliently.

4. A windshield cleaner comprising a saddle member adapted to be supported by a windshield, a primary arm mounted on said saddle and having a primary opening in its main portion, a laterally extending shoulder on said primary arm having a secondary opening therethrough, a wiper arm detachably mounted on said primary arm by extending through said wiper opening and parallel to said primary arm, and having a laterally extending lug projected into said primary opening, a wiper surface on said wiper arm, and a separate and distinct arm extending from the opposite side of said saddle and adapted to engage the windshield.

5. A windshield cleaner comprising a saddle member adapted to be supported by a windshield, a primary arm mounted on said saddle and having a primary opening in its main portion, a laterally extending shoulder on said primary arm having a secondary opening therethrough, a wiper arm detachably mounted on said primary arm by extending through said secondary opening and parallel to said primary arm, and having a laterally extending lug projected into said primary opening, said wiper arm having a free end recurved and extending parallel to said primary arm, a wiper surface on said free end, and a second and distinct arm mounted on the opposite side of said saddle and formed substantially identical with respect to said primary and wiper arms and adapted to engage the opposite side of the windshield glass.

In testimony whereof I affix my signature.

JOHN L. WEBB.